No. 810,888. PATENTED JAN. 23, 1906.
C. STEIN.
VEHICLE TIRE.
APPLICATION FILED SEPT. 29, 1904.
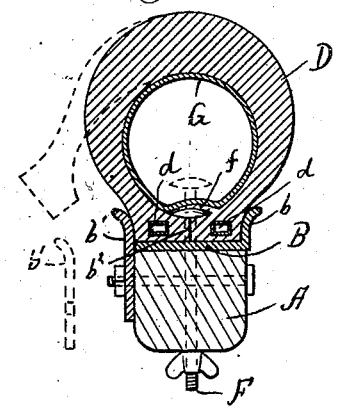
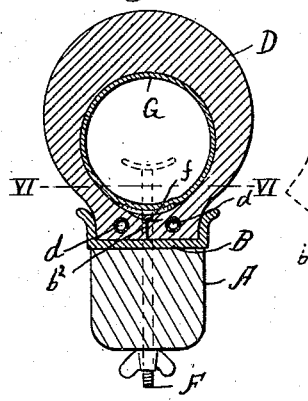
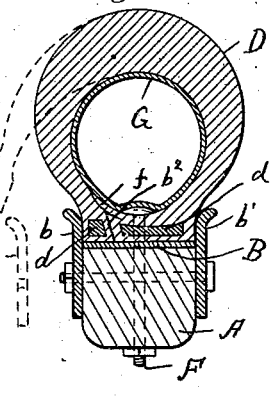
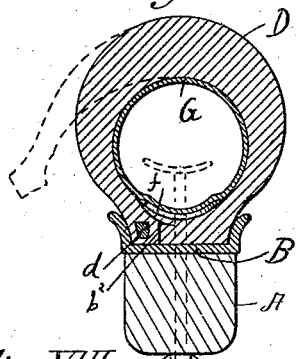
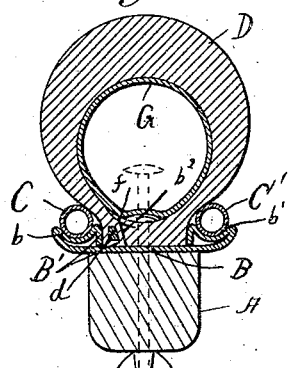
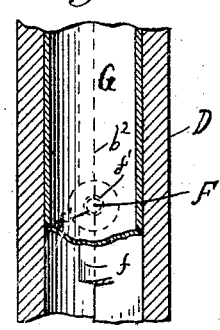
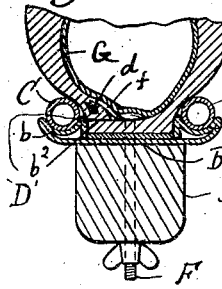
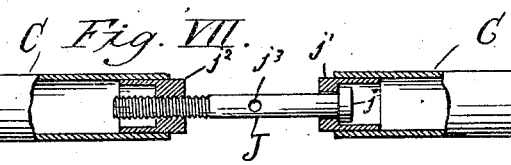
Witnesses:
A. L. Lord
E. B. Donnelly
Charles Stein
Inventor
W. E. Dannells
his Attorney

UNITED STATES PATENT OFFICE.

CHARLES STEIN, OF AKRON, OHIO.

VEHICLE-TIRE.

No. 810,888.     Specification of Letters Patent.     Patented Jan. 23, 1906.

Application filed September 29, 1904. Serial No. 226,463.

*To all whom it may concern:*

Be it known that I, CHARLES STEIN, a citizen of the United States, residing at Akron, in the county of Summit and State of Ohio, have invented certain new and useful Improvements in Vehicle-Tires; and I do hereby declare the following to be a full, clear, and exact description of the invention, such as will enable others skilled in the art to which it pertains to make and use the same.

My invention relates to wheel rims and tires, and more especially to pneumatic tires which employ an inner pneumatic tube and an outer shoe for covering, retaining, and protecting the inner tube.

The objects of my invention are to provide a pneumatic tire of the type set forth whereby the inner tube is completely surrounded by the shoe, is easily removed in portion or wholly for repairs or replacement, and is cushioned at its inner periphery by the inner portions of the shoe; also, to so construct the shoe in combination with the wheel-rim that the said shoe is tightly held in the wheel-rim regardless of the inflation or deflation of the inner tube; also, to provide a construction and combination of parts which will entirely prevent creeping of the shoe on or in the rim or flanges; also, to provide one or both inner contiguous margins or circumferences within the shoe at this part and employing a positive means for securing the shoe to the rim or wheel, which means is removable and adjustable as to tension and in such a manner that it will allow of the removal of one or both edges of the shoe for the purpose of repairs or replacement of either the shoe or the inner tube, and also to provide a means to keep the outer shoe or tire from stretching and the inner tube from being pinched.

My invention consists in the features, parts, and combination of parts hereinafter set forth in the claims.

In the drawings, Figure I is a cross-sectional view illustrating my invention as applied to a wheel with a flange and part of a rim and showing in solid lines the tire in place and the parts in position to hold the same in place and to keep the same from creeping when in this condition, and illustrating also in dotted lines the relation of the parts when the side flange (or part of the same) is removed, also the removal of one side of the shoe. This view also illustrates that the side of the shoe may be removed from the rim either by removing the side flange and loosening the clamping-bolt or by loosening the clamping-bolt and pulling out the side of the shoe over the rim or the flange. Either method may be used, as found convenient or as found necessary. The same can be said of the modifications illustrated in Fig. II. In Fig. I is also illustrated the antistretching material formed of rectangular tubing embedded in both inner margins of the shoe.

Fig. II illustrates a modification of my invention in which the inner margins of the shoe are provided with tubular antistretching material, circular in cross-section, and in which the rim is formed in one piece and either side of the shoe may be removed by loosening the clamping-bolt.

Fig. III shows a construction in which the meeting faces of the shoe are overlapping or diagonal, one of the margins being held firmly in or to the wheel-rim by the clamping-bolt, which passes through the antistretching material and outer shoe and also illustrates one of the margins as being wider and having an overlapping "flap" to prevent pinching of the inner tube. In this figure the antistretching material is shown to be solid and to be embedded in both margins. Also the rim is shown to be formed with separate removable side flanges. One side of the shoe is shown removed by the dotted lines.

Fig. IV illustrates a modified form of construction in which the rim is solid channel shape, and a wide-headed clamping-bolt employed and one margin broader than the other and the antistretching material embedded in the narrow margin, one side of the shoe being shown as removed from the rim by dotted lines.

Fig. V illustrates a modification in which the rim is formed so as to receive annular clamping-bands, which are seated in annular grooves at each side of the rim and are formed so that they can be contracted or expanded by means such as shown in Fig. VII. The shoe may be removed, as shown by dotted lines in Fig. IV.

Fig. VI is an annular cross-sectional view looking at the contiguous margins and illustrating the overlapping flap employed to prevent pinching of the inner tube. This figure also illustrates the recesses formed in the contiguous meeting edges of the shoe to form the hole for the clamping-bolt, which enters both sides of the edges and prevents creeping and which is employed when the contiguous or meeting edges are centrally placed, as in Figs. I and II.

Fig. VII illustrates a means employed for adjusting the clamping-rings shown in Fig. V.

Fig. VIII illustrates a modified form in annular cross-section of the construction illustrated in Fig. V, showing the outer shoe or tire formed with a seat for the inflatable tube extending the entire distance across the rim and preferably having an antistretching material embedded in one side of the shoe or tire, said shoe or tire being held to the rim by a bolt F. This figure also illustrates one side of the tire or shoe resting upon the seat, which is formed integral with the opposite side and resting contiguous to the clamping-band at one side and slightly below the seats or recesses D', and may have a flap $f$ to prevent pinching of the inner tube or in any way injuring the same. By this construction it will be seen that one side of the tire D can be easily and conveniently removed by the removal of the band or ring C, and that the seat beneath the inner tube and upon which said inner tube rests extends the full width of the rim within the channel, forming a continuous seat or cushion for the inner tube G. The manner of removing the side of the tire or shoe in this case is to remove one of the rims C by loosening the bolt J, which also loosens the ring C and slips it over its seat, thus allowing the side of the shoe or tire to be drawn away from the inner tube, leaving a space for access to the said inner tube and for the withdrawal of the same, if necessary. I have found this construction a very convenient one, and inasmuch as the pressure within the inner tube tends to keep the loosened part of the shoe or tire in place when the ring is tightened there is no danger of the same becoming detached.

In tires and rims of the type above set forth it is desirable in the first place that the inner tube should be protected; also, it is desirable that the protecting-shoe should be so constructed and secured to the rim of the wheel that the inner tube is easy of access for mending and removing; also, that the shoe be so secured that it will not creep on the rim; also, that the shoe be mechanically secured to the wheel-rim to withstand all strains incident to traction, and, furthermore, it is desirable that the tires, including the shoe and inner tube, can be applied in the shortest and easiest manner to the wheel and without weakening either the shoe rim or wheel, also a substantial base for the inner tube and outer shoe to rest on. In my construction I have attained all of the above features in a simple and economical manner, as follows:

A represents the wheel-felly, to which is secured a rim of any of the forms illustrated or of other suitable forms. This rim may be formed, as illustrated in Fig. I, by forming the rim B with a side flange $b$ integral therewith and extending outward, as shown, and forming a channel by placing a removable flange $b'$ at the opposite side from $b$. This is my preferred form of channel or rim; but rims constructed as shown in Figs. II and IV, formed of one piece with the rim B, or, as illustrated in Fig. III, formed of separate side flanges $b$ and $b'$ and band B, or even, as shown in Fig. V, of one piece with the rim B so bent as to form a channel B' for receiving the contiguous or meeting margins of the shoe, and having side annular seats $b\ b'$ to receive annular clamping-rings C C' may be employed, it being only necessary that the shoe be supported at opposite sides at its inner circumference at the margins of the shoe.

D represents a shoe which is formed of suitable contour, both outward and inward, to protect and contain an inner inflatable tube G. The shoe D may be formed with or without webbing or inserted woven material; but I prefer that it be formed with said webbing. I also prefer that a non-stretchable material, such as $d$, be inserted at one or both margins near the point of the contiguous parts. Also the shoe D at its point of joining where the margins meet, as at $b^2$, should be provided with an overlying or lapping flap $f$, which will prevent the pinching of the inner tube G. The non-stretchable material $d$ may be of any suitable contour in cross-section, and may be formed of metal or hard rubber or other suitable material, non-elastic or non-stretchable, which will keep the margins, or one of them, from stretching and render them or it firm. In Figs. I, II, and III, I have illustrated a non-stretchable material $d$ as being embedded in both margins of the shoe, while in Figs. IV and V, I have illustrated said material as being embedded in one edge or margin only.

F represents a bolt or fastening device which is provided with any suitable head and passes through the felly and tire, with the head resting upon and binding the inner internal circumference of the shoe D. This bolt F may, as illustrated in Figs. III, IV, and V, pass directly through the material of the shoe, where wide margins are employed, and when so located and positioned will firmly hold the shoe to the rim of the wheel. In this case the narrow margin (see Figs. III and IV, dotted lines) is removed either by taking the side flange $b'\ b$ off, as illustrated in Figs. I and III, or by loosening and raising the bolt F, as illustrated in Fig. IV in dotted lines. In Figs. I and II the bolt F passes through the line of juncture or contiguous and meeting ends of the shoe, and for the purpose of securing the shoe to the rim and to avoid creeping of the shoe a portion of each contiguous edge, as at $f'$, is cut away, thus forming the hole for the bolts to pass through and at the same time prevent the tire from creeping.

In Fig. V the rim is formed in one piece with the tire B and having seats or recesses $b'$ for clamping-rings C C' In this figure the bolt F is also employed for securing the shoe to the rim, and in order to remove the narrow margin the ring C is loosened and taken off or out of its seat. Then this side of the shoe may be removed in the same manner as illustrated in Figs. I, III, and IV; but in order to facilitate this removal it is preferable that the bolt F be loosened, as illustrated in dotted lines.

Fig. VI illustrates the flap $f$ and the position of the bolt F when the contiguous edges are central, and also illustrates the cut-away portion of the shoe $f'$, which allows the bolt F to enter the shoe, which prevents, or aids to prevent, creeping of the shoe on the rim.

In Fig. VII, I have illustrated my preferred form of device for removing, adjusting, or tightening and loosening the rings C or C', (illustrated in Fig. V,) which consists in forming said rings hollow at their ends and employing a screw-threaded bolt J, having a head $j$ held by a bushing $j'$, within which it revolves, and employing a bushing-nut $j^2$, in which the screw-threaded portion of the bolt J works. In order to turn the bolt in either direction, the shank may be made polygonal or have a hole $j^3$ provided in its shank.

It will be seen from the above description, taken in connection with the drawings, that my shoe is first firmly held within the rim by forming the contiguous edges at the inner periphery of the shoe solid excepting at either line of division, thus making a seat upon which the inner tube presses, and, in addition to the bolt F, holding the shoe within the rim, which also prevents the shoe or tire from creeping. It will also be seen that the bolt F acts, auxiliary to the stiffening and non-stretching material $d$, to retain the shoe in position and in contour and allow of the easy removal at one or both sides, as the case may be, to gain access to the inner tube.

If desired or found necessary or convenient, the bolt F, which retains or holds the tire to the rim, may be entirely dispensed with, as the shoe or tire will be retained within its channel by other means, and hence while it may be desirable in some cases to employ it as an auxiliary it is not absolutely essential.

In setting forth this invention I have illustrated a number of modifications of the same, all embodying my invention; but I do not, therefore, wish to be limited to these modifications, as they may be departed from and still the invention be incorporated or embodied.

What I claim is—

1. A combined shoe and rim, for pneumatic tires, embodying a shoe formed with meeting margins forming a seat or support for the inner periphery of the pneumatic tube, means for securing said shoe to the rim passing through the shoe at or near the meeting margins in combination with an embedded non-stretchable material, located in one of the margins.

2. A combined shoe and rim for pneumatic tires, embodying a shoe formed with meeting margins forming a seat or support for the inner periphery of the pneumatic tube, means for securing said shoe to the rim passing through the shoe at or near the meeting margins, in combination with an embedded non-stretchable material located in one or both of the margins, for the purpose set forth.

3. In a vehicle-tire the combination with an outer shoe or covering having contiguous annular edges at the base thereof, and a flap carried by one of said edges and overlapping the other of said edges, of a flanged rim in which the base of said shoe rests, a resilient tube contained within the shoe, a bolt passing through said shoe and the felly of the wheel and an annular, non-stretchable member embedded in the edge of said shoe.

4. The combination with a wheel-felly, of a rim having an integral, annular, upturned flange along one of its edges, an annular plate secured to the felly opposite said flange and extending above said rim, a shoe having contiguous annular edges or margins at the base thereof which lie between said flange and said plate, an annular, non-elastic member embedded in one of said edges, a flap or web carried by one of said edges and overlapping the other of said edges and a retaining-bolt passing through the base of the shoe, the rim and the wheel-felly.

Signed at Cleveland, in the county of Cuyahoga and State of Ohio, this 26th day of August, 1904.

CHARLES STEIN.

Witnesses:
E. B. DONNELLY,
W. E. DONNELLY.